United States Patent
Heywood et al.

(10) Patent No.: US 8,694,685 B2
(45) Date of Patent: Apr. 8, 2014

(54) MIGRATING VIRTUAL MACHINES WITH ADAPTIVE COMPRESSION

(75) Inventors: Patrick B. Heywood, Louisville, CO (US); Sambit Sahu, Hopewell Junction, NY (US); Kunwadee Sripanidkulchai, Bangkok (TH); Jie Zheng, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 13/035,365

(22) Filed: Feb. 25, 2011

(65) Prior Publication Data

US 2012/0221744 A1 Aug. 30, 2012

(51) Int. Cl.
*G06F 15/16* (2006.01)
(52) U.S. Cl.
USPC .......................................... 709/247; 709/223
(58) Field of Classification Search
None
See application file for complete search history.

(56) References Cited

U.S. PATENT DOCUMENTS

| | | | | |
|---|---|---|---|---|
| 4,328,542 A | * | 5/1982 | Anastas et al. | 711/163 |
| 7,813,304 B2 | * | 10/2010 | Salesky et al. | 709/203 |
| 7,940,575 B2 | * | 5/2011 | Ravasio et al. | 365/189.02 |
| 8,135,748 B2 | * | 3/2012 | Rosikiewicz et al. | 707/791 |
| 2011/0219372 A1 | * | 9/2011 | Agrawal et al. | 709/226 |

OTHER PUBLICATIONS

Mell et al., "The NIST Definition of Cloud Computing", Version 15, National Institute of Standards and Technology, Oct. 7, 2009, pp. 1-2.

* cited by examiner

*Primary Examiner* — Jeffrey R Swearingen
(74) *Attorney, Agent, or Firm* — Yee & Associates, P.C.; Louis Percello

(57) ABSTRACT

A method, data processing system, and computer program product for managing images. A processor unit divides an image for a virtual machine into blocks. The processor unit determines whether to compress the blocks prior to transmitting the blocks to a destination for the image. In response to a determination to compress the blocks, the processor unit compresses the blocks to form a compressed set of blocks. The processor unit sends the compressed set of blocks and any uncompressed blocks remaining in the blocks to the destination for the image.

15 Claims, 7 Drawing Sheets

MIGRATING VIRTUAL MACHINES WITH ADAPTIVE COMPRESSION

BACKGROUND

1. Field

The present disclosure relates generally to an improved data processing system and, in particular, to a method and apparatus for managing images. Still more particularly, the present disclosure relates to a method and apparatus for managing images for virtual machines.

2. Description of the Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols. The Internet may carry information and provide services. The information and services include, for example, electronic mail, online chat services, file transfers, web pages, and other resources.

The Internet is a commonly used source of information and entertainment. Further, the Internet is also used a medium for business activities. Many businesses, government entities, and other organizations have a presence on the Internet using websites to perform various transactions. Various organizations may offer goods and services. These goods and services may involve a sale of goods that are to be shipped to a customer. The goods also may be software and/or data purchased by a customer and transferred over the Internet to the customer. Websites, and other resources on the internet, may be provided through the use of servers.

These servers may take the form of computers or software implementations of computers. Virtual machines may be used to provide services to different users on the internet as well as on other types of networks. For example, virtual machines may be used to respond to requests by users to a website for performing different transactions. These transactions may include, for example, without limitation, sales of goods and services.

A virtual machine is a software implementation of a machine that executes instructions like a physical version of the machine. In these examples, the virtual machine is a computer. Many virtual machines may run on a single computer. When multiple virtual machines are present, these virtual machines share the physical resources on which the virtual machines run. Each virtual machine runs its own operating system on the computer and has its own set of applications or processes.

A virtual machine may be moved from one location to another location. In other words, the virtual machine may be moved from one computer to another computer. This type of movement is often referred to as a relocation or migration of the virtual machine. For example, a virtual machine may be migrated from a local area network to a cloud based infrastructure.

The migration of the virtual machine may occur while the virtual machines are live. In other words, the virtual machines may still be responding to requests from clients while the migration of virtual machines occurs. A virtual machine within the virtual machines responding to requests may be halted while that virtual machine is migrated from one location to another location. After the virtual machine has been migrated, that virtual machine may then be restarted to respond to requests. As a result, virtual machines may respond to requests at the locations until all of the virtual machines have been migrated.

In migrating a virtual machine from one location to another location, the image of the virtual machine is copied and moved from the current location to the target location. The current location may be the source computer in which the virtual machine is located, and the destination is the computer in which the virtual machine is to be moved to as part of the migration.

An image for a virtual machine may vary in size. In some cases, the size may be large. For example, an image may be, for example, without limitation, 10 gigabytes or 50 gigabytes. While the virtual machine is being moved from the source to the destination, the virtual machine is halted and does not process requests or perform other processing. The virtual machine is not started until the transfer of the image completes. As a result, it is desirable to complete the transfer of the image for the virtual machine as fast as possible to reduce the amount of time that the virtual machine does not process requests.

Therefore, it would be advantageous to have a method and apparatus that takes into account at least some of the issues discussed above, as well as possibly other issues.

SUMMARY

The different illustrative embodiments provide a method, data processing system, and computer program product for managing images. A processor unit divides an image for a virtual machine into blocks. The processor unit determines whether to compress the blocks prior to transmitting the blocks to a destination for the image. In response to a determination to compress the blocks, the processor unit compresses the blocks to form a compressed set of blocks. The processor unit sends the compressed set of blocks and any uncompressed blocks remaining in the blocks to the destination for the image.

DETAILED DESCRIPTION

Figure 1:
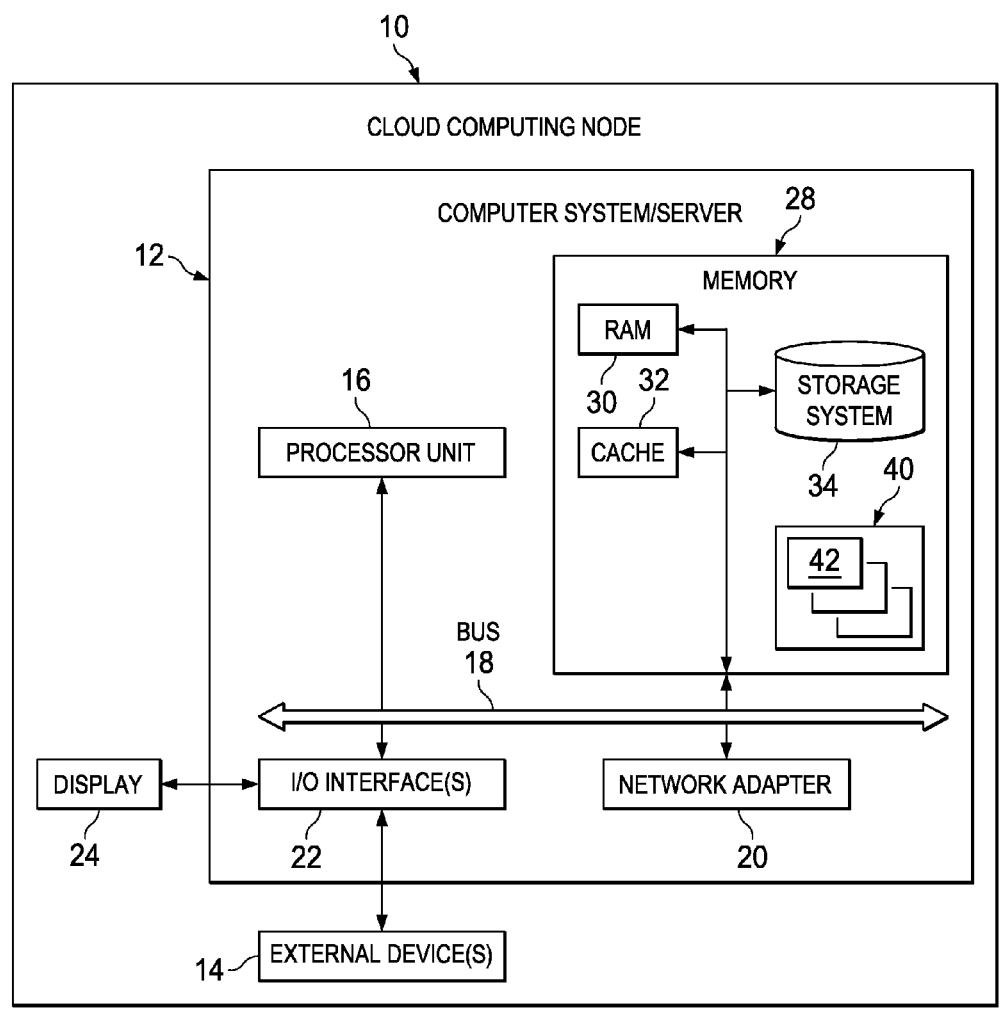
FIG. 1 is a cloud computing node in accordance with an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by, or in connection with, the instruction execution system, apparatus, or device. The computer usable medium may include a propagated data signal with the computer usable program code, embodied therewith, either in baseband or as part of a carrier wave. The computer usable program code may be transmitted using any appropriate medium, including, but not limited to, wireless, wireline, optical fiber cable, radio frequency, etc.

Computer program code for carrying out operations of the present invention may be written in any combination of one or more programming languages, including an object oriented programming language such as Java, Smalltalk, C++, or the like, and conventional procedural programming languages, such as the "C" programming language, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowcharts and/or block diagrams of methods, apparatuses (systems) and computer program products according to embodiments of the invention. It will be understood that each block of the flowcharts and/or block diagrams, and combinations of blocks in the flowcharts and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture, including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process, such that the instructions, which execute on the computer or other programmable apparatus, provide processes for implementing the functions/acts specified in the flowchart and/or block diagram block or blocks.

It is understood in advance that, although this disclosure includes a detailed description on cloud computing, implementation of the teachings recited herein are not limited to a cloud computing environment. Rather, embodiments of the present invention are capable of being implemented in conjunction with any other type of computing environment now known, or later developed.

For convenience, the Detailed Description includes the following definitions which have been derived from the "Draft NIST Working Definition of Cloud Computing" by Peter Mell and Tim Grance, dated Oct. 7, 2009.

Cloud computing is a model of service delivery for enabling convenient, on-demand network access to a shared pool of configurable computing resources (e.g. networks, network bandwidth, servers, processors, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources, dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resources use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications, and possibly, application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly, limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a cloud computing node is depicted in accordance with an illustrative embodiment. Cloud computing node 10 is only one example of a suitable cloud computing node and is not intended to suggest any limitation as to the scope of use, or functionality, of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processor unit 16, a memory 28, and a bus 18 that couples various system components, including memory 28, to processor unit 16.

Processor unit 16 executes instructions for software that may be loaded into memory 28. Processor unit 16 may be a number of processors, a multi-processor core, or some other type of processor, depending on the particular implementation. A number, as used herein with reference to an item, means one or more items. Further, processor unit 16 may be implemented using a number of heterogeneous processor systems in which a main processor is present with secondary processors on a single chip. As another illustrative example, processor unit 16 may be a symmetric multi-processor system containing multiple processors of the same type.

Bus 18 represents one or more of any of several types of bus structures, including a memory bus or memory controller, a peripheral bus, an accelerated graphics port, a processor, or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and includes both volatile and non-volatile media, and removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from, and writing to, a non-removable, non-volatile magnetic media (not shown and typically called a "hard drive"). Although not shown, a magnetic disk drive for reading from, and writing to, a removable, non-volatile magnetic disk (e.g., a "floppy disk"), and an optical disk drive for reading from, or writing to, a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data, or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, one or more devices that enable a user to interact with computer system/server 12, and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that, although not shown, other hardware and/or software components could be used in conjunction with computer system/server 12. Examples include, but are not limited to, microcode, device drivers, redundant processing units, external disk drive arrays, RAID systems, tape drives, data archival storage systems, etc.

Figure 2:
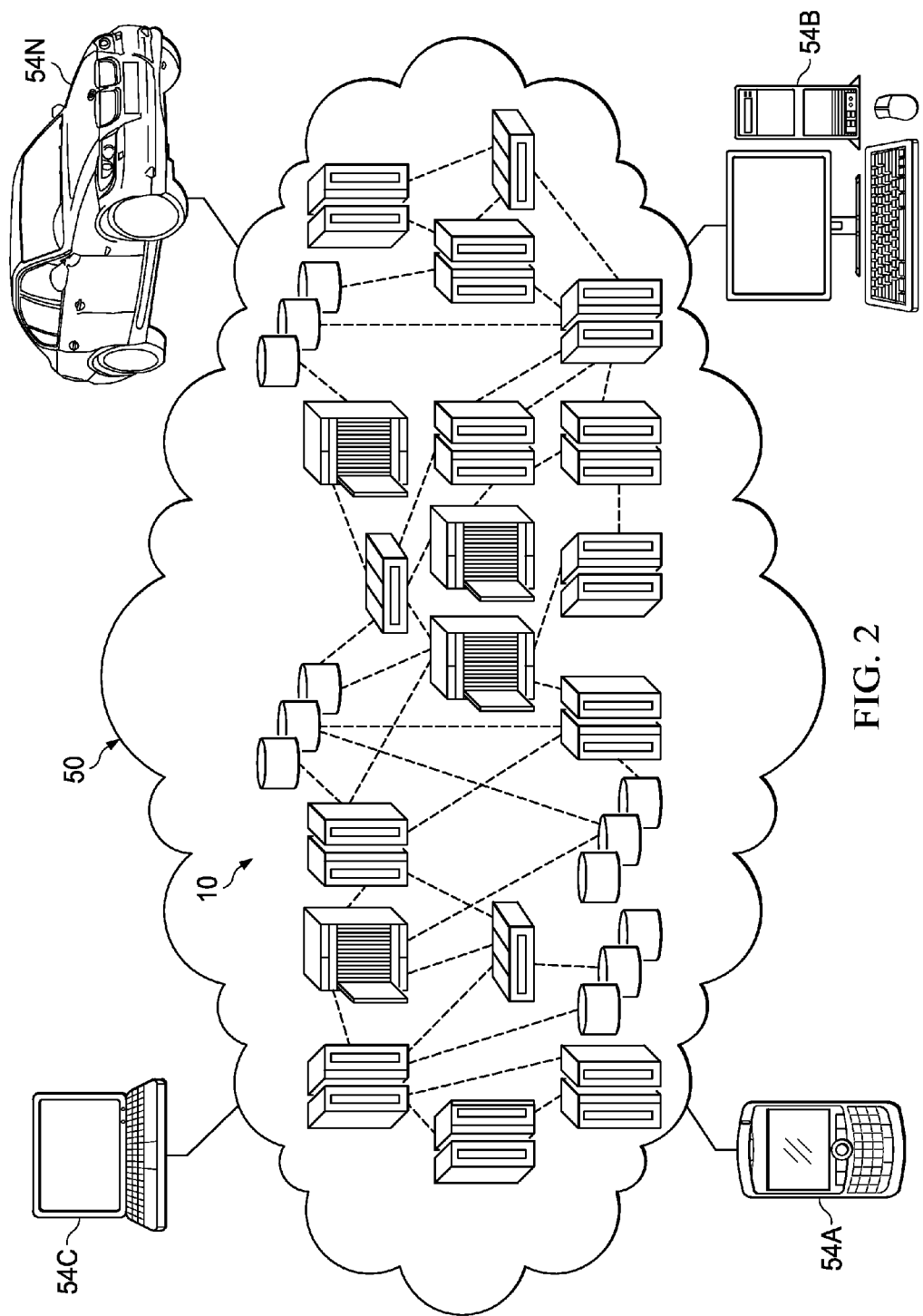
FIG. 2 is an illustration of a cloud computing environment in accordance with an illustrative embodiment.

Referring now to FIG. 2, an illustration of a cloud computing environment is depicted in accordance with an illustrative embodiment. As shown, cloud computing environment 50 comprises one or more cloud computing nodes 10 with which local computing devices, used by cloud consumers, such as, for example, personal digital assistant (PDA) or cellular telephone 54A, desktop computer 54B, laptop computer 54C, and/or automobile computer system 54N, may communicate. Nodes 10 may communicate with one another. They may be grouped (not shown) physically or virtually, in one or more networks, such as Private, Community, Public, or Hybrid clouds, as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that nodes 10 and cloud computing environment 50 can communicate with any type of computerized device over any type of network and/or network addressable connection (e.g., using a web browser). Program code located on one of nodes 10 may be stored on a computer recordable storage medium in one of nodes 10 and downloaded to a computing device within computing devices 54A-N over a network for use in these computing devices. For example, a server computer in computing nodes 10 may store program code on a computer readable storage medium on the server computer. The server computer may download the program code to a client computer in computing devices 54A-N for use on the client computer.

Figure 3:
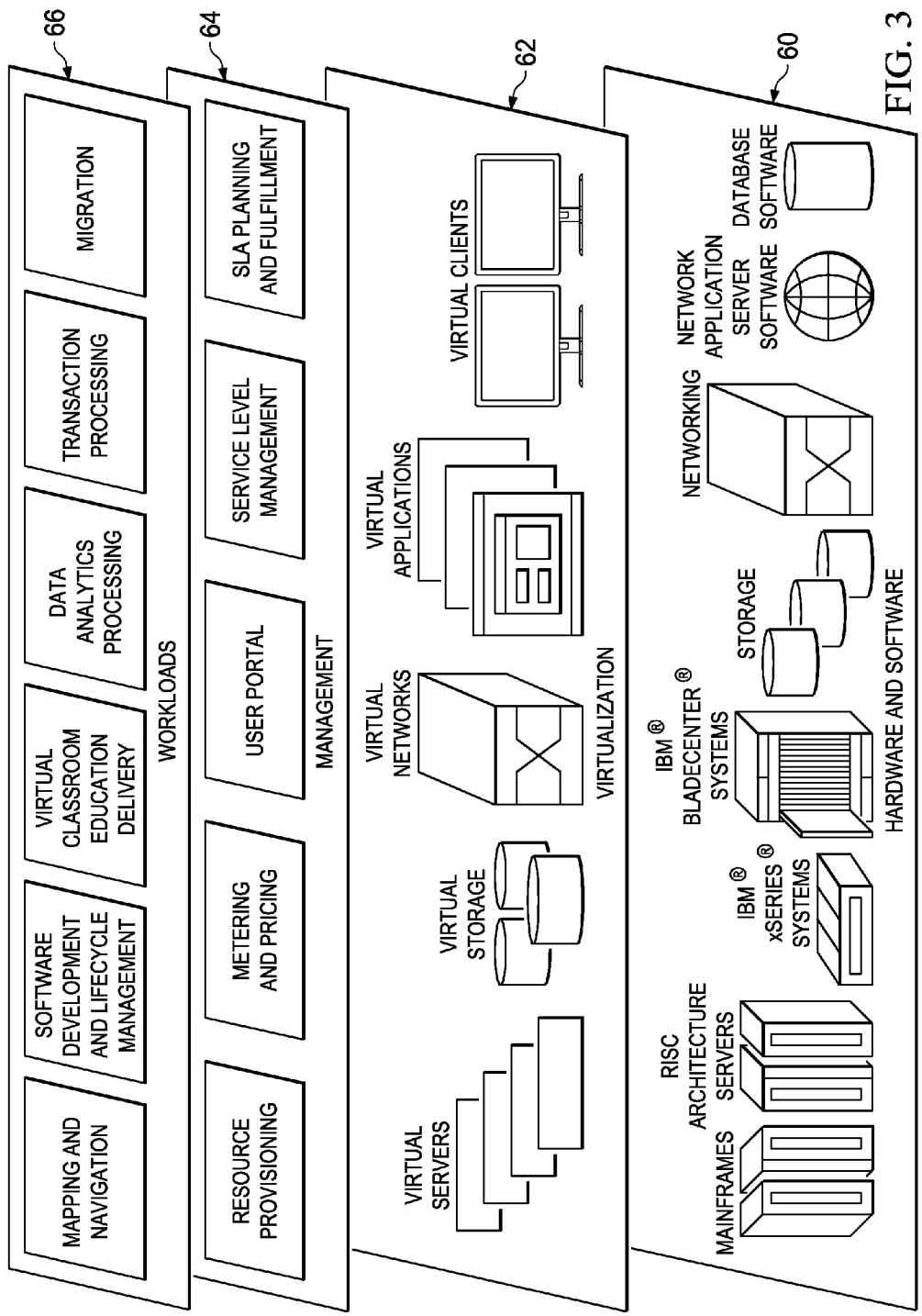
FIG. 3 is an illustration of abstraction model layers in accordance with an illustrative embodiment.

Referring now to FIG. 3, an illustration of abstraction model layers is depicted in accordance with an illustrative embodiment. In this example, a set of functional abstraction layers, provided by cloud computing environment 50 in FIG. 2, is shown. It should be understood in advance that the components, layers, and functions shown in FIG. 3 are intended to be illustrative only, and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one illustrative example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and migration. With migration in work loads layer 66, virtual machines may be moved from one location to another location. The movement of virtual machines may involve moving images for the virtual machines. Migration in work loads layer 66 may perform the transfer of images to move virtual machines in accordance with an illustrative embodiment.

The different illustrative embodiments recognize and take into account a number of different considerations. For example, the different illustrative embodiments recognize and take into account that, in reducing the amount of time and resources needed to move an image for a virtual machine, a reduction in the amount of data to be moved is desirable.

The different illustrative embodiments recognize and take into account that one manner in which network bandwidth use is reduced is to minimize the number of bits that are transferred over the network. The different illustrative embodiments recognize and take into account that one manner in which the reduction in the use of resources on the network may occur is to compress the image. The different illustrative embodiments recognize and take into account that the image may be compressed as much as possible prior to the transfer of the image.

The different illustrative embodiments recognize and take into account that the transfer of images for virtual machines may use resources on the network. For example, in transferring an image from a source to a destination on a network, bandwidth in the network is used. Depending on the size of the images for virtual machines, the number of virtual machines, and virtual machines being migrated, the amount of bandwidth used in the network may be greater than desired.

The different illustrative embodiments recognize and take into account that compression, however, requires resources on the computer on which the image is located. For example, processor resources are required to compress the image. The use of processor resources for compression may reduce the performance of other operations on the computer. As an illustrative example, the computer may host a number of virtual machines. The processing of requests by these virtual machines may be slowed down if processor resources are used to compress an image. Consequently, the different illustrative embodiments recognize and take into account that compression of the image may not always be desirable.

Thus, the different illustrative embodiments provide a method and apparatus for managing images. In one illustrative embodiment, a process unit divides an image for a virtual machine into blocks. A determination is made as to whether to compress the blocks prior to transmitting the blocks to a destination for the image. In response to a determination to compress the blocks, the blocks are compressed to form a compressed set of blocks. The process then sends the compressed set of blocks and any uncompressed blocks remaining in the blocks to the destination.

Figure 4:
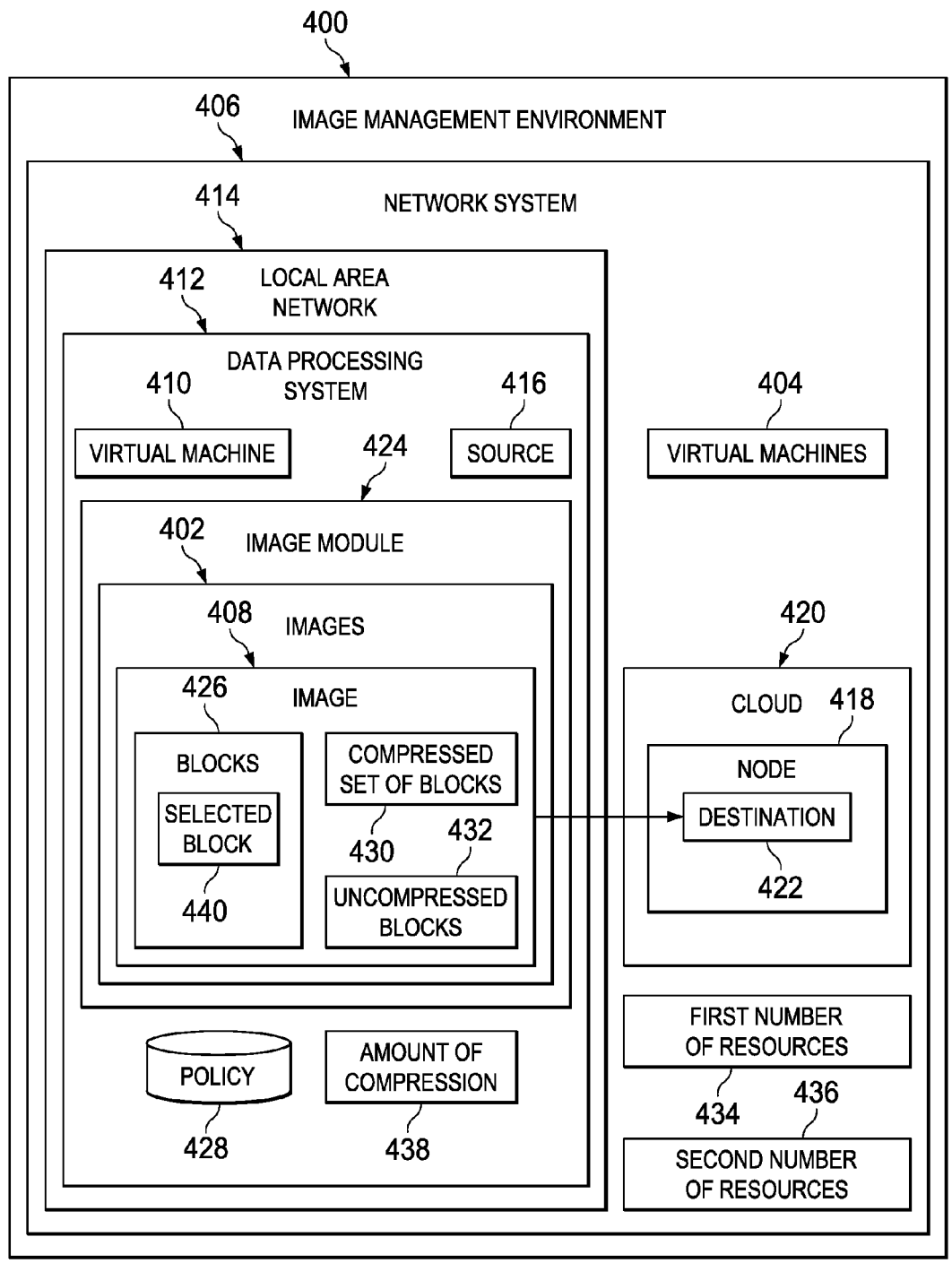
FIG. 4 is an illustration of an image management environment in accordance with an illustrative embodiment.

With reference now to FIG. 4, an illustration of an image management environment is depicted in accordance with an illustrative embodiment. Image management environment 400 may be used to manage images 402 for virtual machines 404. In these illustrative examples, virtual machines 404 may be present in network system 406. In these illustrative examples, image management environment 400 may be implemented in cloud computing environment 50 in FIG. 2, a local area network, or in some other suitable type of network or computing environment.

As depicted, image 408, in images 402, is an image for virtual machine 410 in virtual machines 404. In these illustrative examples, virtual machine 410 may be located on data processing system 412 on local area network 414 in network system 406.

In these examples, data processing system 412 is source 416 for image 408 for virtual machine 410. Image 408 is transferred to node 418 in cloud 420 in network system 406 in this particular example. Node 418 is destination 422 for image 408.

In these illustrative examples, local area network 414 and cloud 420 are examples of networks that may be present in network system 406. In these examples, network system 406 may include one or more networks. For example, in other embodiments, network system 406 may include only local area network 414 and the destination may be another computer in local area network 414. Additionally, network system 406 may include any intervening networks between local area network 414 and cloud 420 through which selected block 440 travels from source 416 to destination 422.

In these illustrative examples, the transfer of image 408 from source 416 to destination 422 is managed using image module 424. Image module 424 may be implemented using hardware, software, or a combination of the two. In these illustrative examples, image module 424 may be located on data processing system 412.

Image module 424 divides image 408 into blocks 426. Blocks 426 may all have the same size, or different blocks within blocks 426 may have different sizes. In other words, each block in block 426 may have sizes different from other blocks within blocks 426.

In this example, image module 424 determines whether to compress blocks 426 for image 408 prior to transmitting blocks 426 from source 416 to destination 422. This determination is made using policy 428. Policy 428 is a number of rules used to determine whether to compress blocks 426. As used herein, a number, when used with reference to an item, means one or more items. For example, "a number of rules" is one or more rules.

In response to a determination to compress blocks 426, image module 424 compresses blocks 426 to form compressed set of blocks 430. Compressed set of blocks 430 may be a subset of blocks 426, or may include all of blocks 426. Thereafter, image module 424 sends compressed set of blocks 430 and any uncompressed blocks 432 remaining in blocks 426 to destination 422.

Policy 428 may specify rules for when compression should be performed for blocks 426. In these illustrative examples, policy 428 may be based on first number of resources 434 needed to compress blocks 426 and second number of resources 436 needed to transmit blocks 426 to destination 422. In these examples, second number of resources 436 may be resources needed to transmit blocks 426 in an uncompressed form.

First number of resources 434 may be resources located in a computer that perform compression of blocks 426. First number of resources 434 may be, for example, without limitation, processor resources, memory, hard disk drives, and/or other suitable resources used in compressing blocks 426. Second number of resources 436 may be resources in one or more networks used to transmit blocks 426. Second number of resources 436 may include, for example, without limitation, local area network 414, cloud 420, a switch, a router, a proxy server, bandwidth, and other resources used to move blocks 426 from source 416 to destination 422.

With the use of policy 428, image module 424 may compress some, none, or all of blocks 426. Further, policy 428 also may be used by image module 424 to identify amount of compression 438 to compress blocks 426 that are identified for compression. Further, amount of compression 438 may differ for each block depending on the particular implementation.

For example, in one illustrative embodiment, image module 424 may examine each block in blocks 426 prior to sending the block to destination 422. For example, image module 424 selects selected block 440 in blocks 426 for sending to destination 422. At that time, image module 424 may determine whether to compress selected blocks 440 using policy 428.

This determination may be based on the current first number of resources 434 needed to compress selected block 440 and second number of resources 436 needed to transmit selected block 440 at that time. Further, image module 424 may also take into account whether using first number of resources 434 to compress selected block 440 before sending selected block 440 to destination 422 will reduce the number of resources available to other processes and/or applications running on data processing system 412 in an undesirable manner. After a determination is made to compress selected block 440 and an amount of compression is identified, selected block 440 is sent to destination 422 from source 416. In this illustrative example, selected block 440 is sent over network system 406.

Thereafter, another block is selected for processing as selected block 440. At this time, changes in first number of resources 434 and/or second number of resources 436 may result in a different determination as to whether selected block 440 should be compressed and, if selected block 440 is to be compressed, how much compression is to occur. In this manner, image module 424 may take into account changes that occurred to first number of resources 434 and second number of resources 436 during processing of blocks 426 for image 408.

In this manner, the different illustrative embodiments provide a method and apparatus to transfer images 402 in a manner that reduces undesired effects in the use of first number of resources 434 and second number of resources 436. For example, if additional processes are using higher amounts of first number of resources 434 than at a prior time, the amount of compression, or whether compression occurs, may be different as compared to when the use of first number of resources 434 is lower. Further, the second number of resources 436 may involve an amount of traffic traveling through a switch through which blocks 426 are sent to destination 422. If other additional traffic is present, then compression of blocks 426 may occur, and amount of compression 438 may be higher than as compared to when less traffic is present through the switch.

The illustration of image management environment 400 is not meant to imply physical or architectural limitations to the manner in which different illustrative embodiments may be implemented. Other components in addition to, and/or in place of, the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, although the illustrative examples depict the transfer of virtual machine 410 from local area network 414 to cloud 420, the different illustrative embodiments may be applied to other types of transfers of image 408 for virtual machine 410. For example, virtual machine 410 may be moved from one computer to another computer in local area network 414. In yet other illustrative examples, the movement of virtual machine 410 may be from one node in cloud 420 to another node in cloud 420.

As another example, image module 424 may be located on another computer other than data processing system 412. For example, image module 424 may even be located on a computer within local area network 414 or in cloud 420. In yet other illustrative examples, the transfer of image 408 for virtual machine 410 may be within local area network 414. In still yet other illustrative examples, additional numbers of images, in addition to image 408, may be transferred from different sources to different destinations at the same time as the transfer of image 408 by image module 424.

Figure 5:
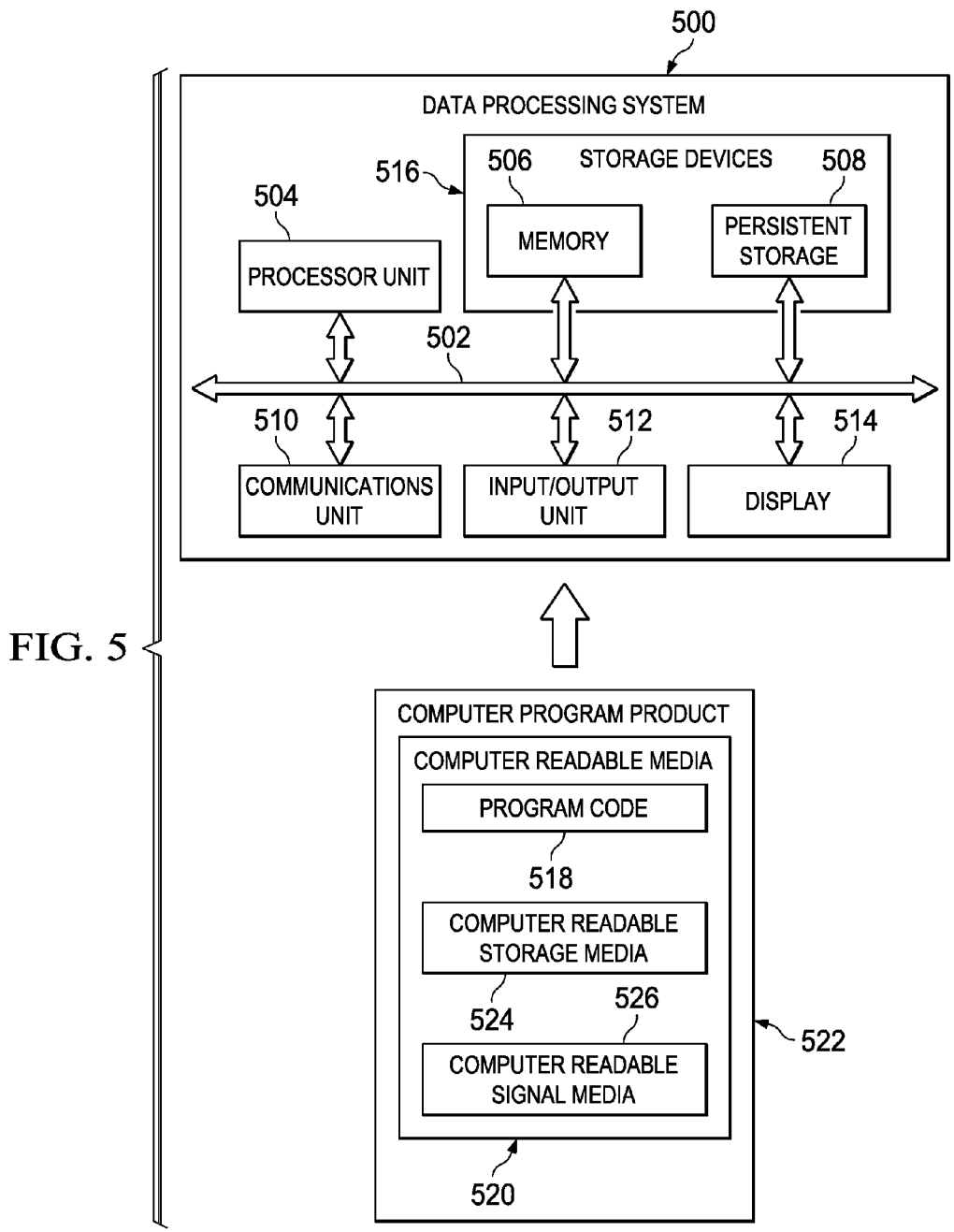
FIG. 5 is an illustration of a data processing system in accordance with an illustrative embodiment.

Turning now to FIG. 5, an illustration of a data processing system is depicted in accordance with an illustrative embodiment. In these illustrative examples, data processing system 500 may be used to implement different data processing systems in image management environment 400. For example, without limitation, data processing system 500 may be used to implement node 10, cellular telephone 54A, desktop computer 54B, laptop computer 54C, automobile computer system 54N, or other suitable hardware systems in image management environment 400.

In this illustrative example, data processing system 500 includes communications fabric 502, which provides communications between different components in data processing system 500. In this example, communications fabric 502 provides communication between processor unit 504, memory 506, persistent storage 508, communications unit 510, input/output (I/O) unit 512, and display 514.

Processor unit 504 serves to execute instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526. Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500. In these illustrative examples, computer readable storage media 524 is a non-transitory computer readable storage medium.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different illustrative embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506, or a cache, such as found in an interface and memory controller hub that may be present in communications fabric 502.

Figure 6:
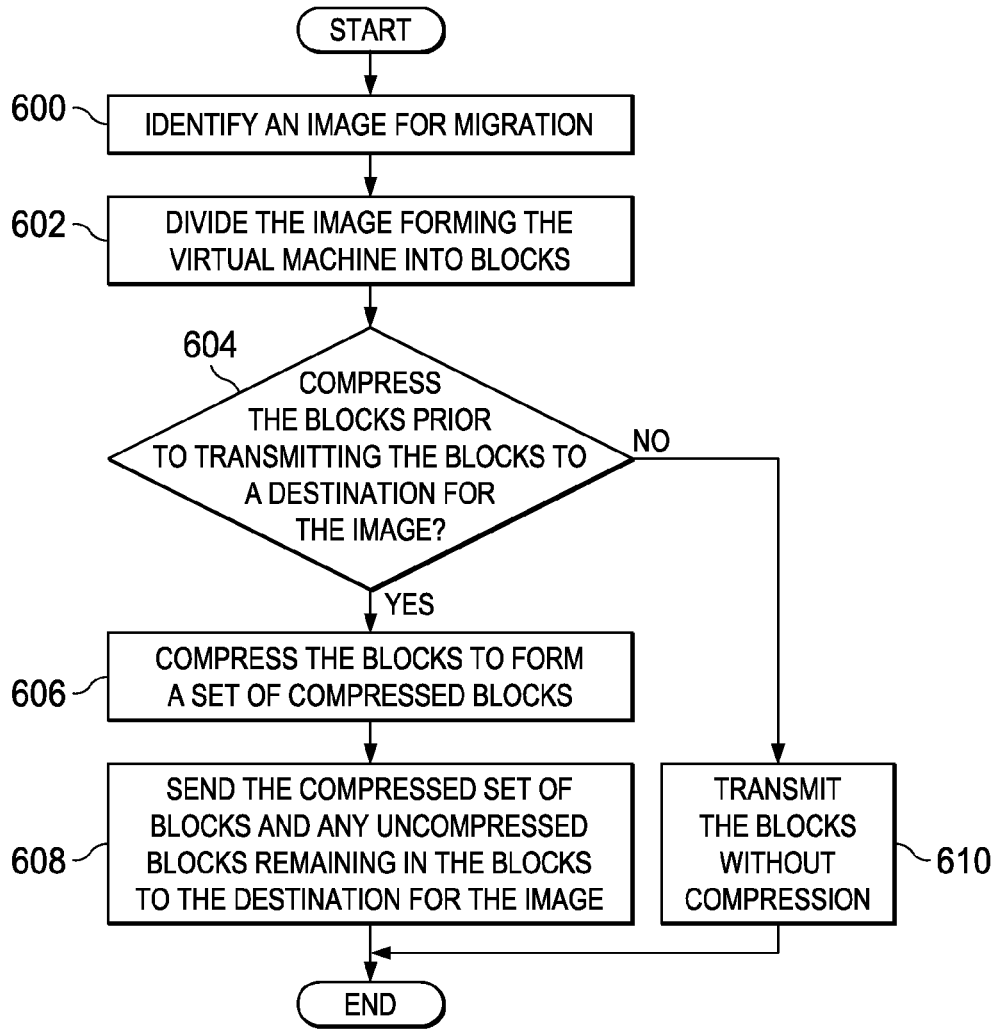
FIG. 6 is an illustration of a flowchart of a process for managing images in accordance with an illustrative embodiment.

With reference now to FIG. 6, an illustration of a flowchart of a process for managing images is depicted in accordance with an illustrative embodiment. The process illustrated in FIG. 6 may be implemented in hardware, software, or a combination of the two. In these examples, this process may be implemented for use by image module 424 in FIG. 4.

The process begins by identifying an image for migration (step 600). Thereafter, the process divides the image forming the virtual machine into blocks (step 602). A determination is made as to whether to compress the blocks prior to transmitting the blocks to a destination for the image (step 604). Step 604 may be performed using a policy such as, for example, policy 428 in FIG. 4.

If the blocks are to be compressed, the blocks are compressed to form a set of compressed blocks (step 606). The compression of the blocks in step 606 may result in the compression of some, or all of, the blocks depending on the particular policy and implementation. Thereafter, the process sends the compressed set of blocks and any uncompressed blocks remaining in the blocks to the destination for the image (step 608) with the process terminating thereafter.

With reference again to step 604, if the blocks are not to be compressed, the process then transmits the blocks without compression (step 610) with the process terminating thereafter.

Figure 7:
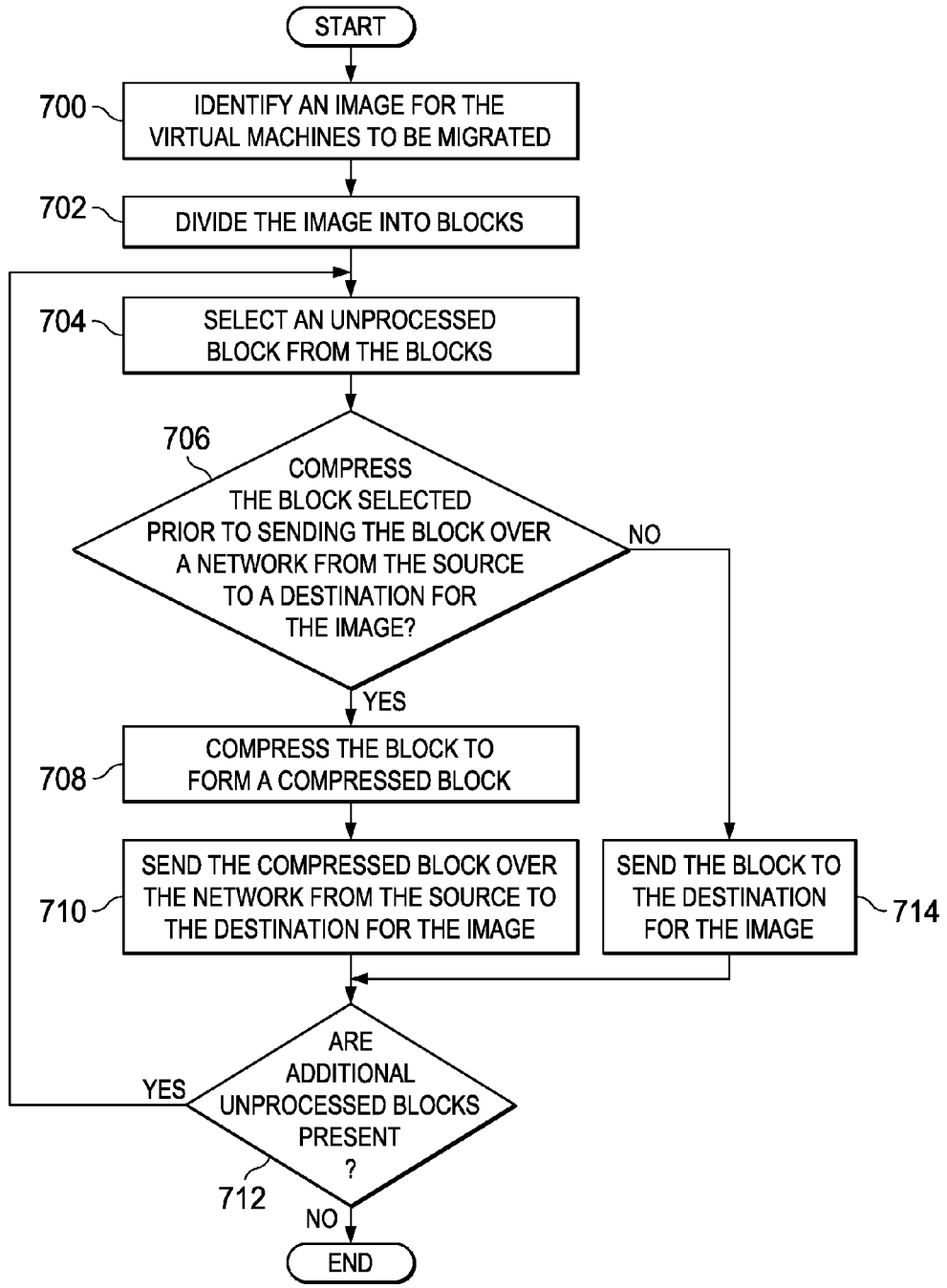
FIG. 7 is an illustration of a flowchart of a process for managing an image in accordance with an illustrative embodiment.

With reference now to FIG. 7, a flowchart of a process for managing an image is depicted in accordance with an illustrative embodiment. The process illustrated in FIG. 7 may be implemented in software, hardware, or a combination of the two. In these illustrative examples, this process may be implemented in image module 424 in FIG. 4.

The process begins by identifying an image for a virtual machine to be migrated (step 700). The virtual machine may be located on a network that is a source for the migration. Thereafter, the image is divided into blocks (step 702). The process then selects an unprocessed block from the blocks (step 704).

A determination is made as to whether the block selected should be compressed prior to sending the block over a network from the source to a destination for the image (step 706). In step 706, a determination may be made using a policy. This policy may take into account a first number of resources needed for compressing the block and a second number of resources for sending the block over the network.

In this illustrative example, the first number of resources may include, for example, without limitation, processor resources, memory, hard disk, and/or other suitable types of resources. The second number of resources may include, for example, without limitation, bandwidth. The policy used to make the determination in step 706 takes into account that using the first number of resources to compress the block prior to sending the block to the destination may have an undesirable effect on other processes running at the source. For example, using the first number of resources to compress the block may reduce the number of resources that can be used by other processes and/or applications.

Further, the policy also takes into account that sending a block from the source to the destination without compressing the block may reduce the available bandwidth between the source and the destination. The determination in step 706 is made based on whether a reduction in the number of resources that can be used by other applications and/or processes at the source or a reduction in available bandwidth between the source and the destination is more undesirable at the time the determination of whether to compress the block is being made.

If the block is to be compressed, the process compresses the block to form a compressed block (step 708). The process then sends the compressed block over the network from the source to the destination for the image (step 710). The process then determines whether additional unprocessed blocks are present (step 712). If additional unprocessed blocks are present, the process returns to step 704 to select another block for processing. Otherwise, the process terminates.

With reference again to step 706, if the block is not to be compressed, the process sends the block to the destination for the image (step 714) with the process then proceeding to step 712 as discussed above.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the different illustrative embodiments provide a method and apparatus for managing images. The process divides an image for a virtual machine into blocks. A determination is made as to whether to compress the block prior to transmitting the blocks to a destination for the image. In response to a determination to compress the blocks, the blocks are compressed to form a compressed set of blocks. The process then sends the compressed set of blocks and any uncompressed block remaining in the blocks to the destination for the image.

In this manner, the different illustrative embodiments may reduce the use of resources needed to migrate an image from a source to a destination. The reduction in the use of resources may be those needed to compress the blocks and/or those needed to transfer the blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, semiconductor system (apparatus or device), or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output, or I/O devices (including but not limited to keyboards, displays, pointing devices, etc.), can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for migrating virtual machine images, the method comprising:

dividing, by a data processing system, an image for a virtual machine into blocks;

determining, by the data processing system, whether to compress the blocks prior to transmitting the blocks to a destination for the image based on a determination that using a first number of resources in the data processing system needed to compress the blocks does not reduce available resources in the data processing system to perform other operations running on the data processing system;

determining, by the data processing system, whether to compress the blocks prior to transmitting the blocks to the destination for the image based on a second number of resources needed to transmit the blocks over a network system from the data processing system to the destination for the image;

determining, by the data processing system, for each block in the blocks, whether to compress the each block prior to transmitting the each block to the destination for the image based on the first number of resources in the data processing system needed to compress the each block and the second number of resources needed to transmit the each block to the destination for the image;

responsive to the data processing system determining, for each block in the blocks, to compress the each block prior to transmitting the each block to the destination for the image based on the first number of resources in the data processing system needed to compress the each block and the second number of resources needed to transmit the each block to the destination for the image, compressing, by the data processing system, the blocks to form a compressed set of blocks; and sending, by the data processing system, the compressed set of blocks and any uncompressed blocks remaining in the blocks to the destination for the image of the virtual machine.

2. The method of claim 1 further comprising:

responsive to the data processing system determining, for each block in the blocks, to compress the each block prior to transmitting the each block to the destination for the image, identifying an amount of compression for each of the blocks; and wherein the compressing step comprises:

responsive to the data processing system determining, for each block in the blocks, to compress the each block prior to transmitting the each block to the destination for the image, compressing, by the data processing system, the each block by a different amount of compression based on the identified amount of compression for each of the blocks to form the compressed set of blocks.

3. The method of claim 1, wherein the blocks of the image for the virtual machine have different sizes.

4. The method of claim 1, wherein the first number of resources comprises at least one of processor resources and memory.

5. The method of claim 1, wherein the second number of resources comprises bandwidth.

6. A method for migrating an image for a virtual machine, the method comprising:

dividing, by a processor unit, the image for the virtual machine into a plurality of blocks;

determining, by the processor unit, whether to compress a block in the plurality of blocks prior to transmitting the block to a destination for the image based on a determination that using a first number of resources in a data processing system used to compress the block does not reduce available resources in the data processing system to perform other operations running on the data processing system;

determining, by the processor unit, whether to compress the block in the plurality of blocks prior to transmitting the block to the destination for the image based on a second number of resources needed to transmit the block over a network system from the data processing system to the destination for the image;

determining, by the processor unit, whether to compress the block prior to transmitting the block to the destination for the image based on the first number of resources in the data processing system needed to compress the block and the second number of resources needed to transmit the block to the destination for the image;

responsive to the processor unit determining to compress the block prior to transmitting the block to the destination for the image based on the first number of resources in the data processing system needed to compress the each block and the second number of resources needed to transmit the block to the destination for the image, compressing, by the processor unit, the block to form a compressed block; and sending, by the processor unit, the compressed block over a network system from the data processing system to the destination for the image of the virtual machine.

7. The method of claim 6 further comprising:

responsive to the processor unit determining to not compress the block, sending, by the processor unit, the block to the destination for the image.

8. A data processing system for migrating virtual machine images, the data processing system comprising:

a bus;

a communications unit connected to the bus;

a storage device connected to the bus, wherein the storage device includes program code; and a processor unit connected to the bus, wherein the processor unit executes the program code to divide an image for a virtual machine into blocks; determine whether to compress the blocks prior to transmitting the blocks to a destination for the image based on a determination that using a first number of resources in the data processing system needed to compress the blocks does not reduce available resources in the data processing system to perform other operations running on the data processing system; determine whether to compress the blocks prior to transmitting the blocks to the destination for the image based on a second number of resources needed to transmit the blocks over a network system from the data processing system to the destination for the image; determine, for each block in the blocks, whether to compress the each block prior to transmitting the each block to the destination for the image based on the first number of resources in the data processing system needed to compress the each block and the second number of resources needed to transmit the each block to the destination for the image;

compress the blocks to form a compressed set of blocks in response to determining, for each block in the blocks, to compress the each block prior to transmitting the each block to the destination for the image based on the first number of resources in the data processing system needed to compress the each block and the second number of resources needed to transmit the each block to the destination for the image; and send the compressed set of blocks and any uncompressed blocks remaining in the blocks to the destination for the image of the virtual machine.

9. The data processing system of claim 8, wherein the processor unit further runs the program code to identify an amount of compression for each of the blocks in response to the processor unit determining, for each block in the blocks, to compress the each block prior to transmitting the each block to the destination for the image; and wherein in running the program code to compress the blocks to form the compressed set of blocks, the processor unit runs the program code to compress the each block by a different amount of compression based on the identified amount of compression for each of the blocks to form the compressed set of blocks in response to the processor unit determining, for each block in the blocks, to compress the each block prior to transmitting the each block to the destination for the image.

10. The data processing system of claim 8, wherein the blocks of the image for the virtual machine have different sizes.

11. The data processing system of claim 8, wherein the first number of resources comprises at least one of processor resources and memory.

12. The data processing system of claim 8, wherein the second number of resources comprises bandwidth.

13. A computer program product for migrating virtual machine images, the computer program product comprising a computer readable storage device;

program code, stored on the computer readable storage device, for dividing an image for a virtual machine into blocks;

program code, stored on the computer readable storage device, for determining whether to compress the blocks prior to transmitting the blocks to a destination for the image based on a determination that using a first number of resources in a data processing system needed to compress the blocks does not reduce available resources in the data processing system to perform other operations running on the data processing system;

program code, stored on the computer readable storage device, for determining whether to compress the blocks prior to transmitting the blocks to the destination for the image based on a second number of resources needed to transmit the blocks over a network system from the data processing system to the destination for the image;

program code, stored on the computer readable storage device, for determining, for each block in the blocks, whether to compress the each block prior to transmitting the each block to the destination for the image based on the first number of resources in the data processing system needed to compress the each block and the second number of resources needed to transmit the each block to the destination for the image;

program code, stored on the computer readable storage device, for compressing the blocks to form a compressed set of blocks in response to determining, for each block in the blocks, to compress the each block prior to transmitting the each block to the destination for the image based on the first number of resources in the data processing system needed to compress the each block and the second number of resources needed to transmit the each block to the destination for the image; and program code, stored on the computer readable storage device, for sending the compressed set of blocks and any uncompressed blocks remaining in the blocks to the destination for the image of the virtual machine.

14. The computer program product of claim 13 further comprising:

program code, stored on the computer readable storage device, for identifying an amount of compression for each of the blocks in response to determining, for each block in the blocks, to compress the each block prior to transmitting the each block to the destination for the image; and wherein the program code, stored on the computer readable storage device, for compressing the blocks to form the compressed set of blocks comprises:

program code, stored on the computer readable storage device, for compressing the each block by a different amount of compression based on the identified amount of compression for each of the blocks to form the compressed set of blocks in response to determining, for each block in the blocks, to compress the each block prior to transmitting the each block to the destination for the image.

15. The computer program product of claim 13, wherein the first number of resources comprises at least one of processor resources and memory, and wherein the second number of resources comprises bandwidth.

* * * * *